US012646736B2

(12) United States Patent
Bae et al.

(10) Patent No.: US 12,646,736 B2
(45) Date of Patent: Jun. 2, 2026

(54) BATTERY CELL PRESSURIZATION DEVICE

(71) Applicant: LG ENERGY SOLUTION, LTD.,
Seoul (KR)

(72) Inventors: Dong Hun Bae, Daejeon (KR); **Dong
Wook Sung, Daejeon (KR); Ji Eun
Kim, Daejeon (KR); Jin Young Shin**,
Daejeon (KR); Hwan Ho Shin,
Daejeon (KR); Yeo Ju Yoon, Daejeon
(KR)

(73) Assignee: LG ENERGY SOLUTION, LTD.,
Seoul (KR)

( * ) Notice: Subject to any disclaimer, the term of this
patent is extended or adjusted under 35
U.S.C. 154(b) by 522 days.

(21) Appl. No.: 18/039,161

(22) PCT Filed: Sep. 22, 2022

(86) PCT No.: PCT/KR2022/014195
§ 371 (c)(1),
(2) Date: May 26, 2023

(87) PCT Pub. No.: WO2023/054982
PCT Pub. Date: Apr. 6, 2023

(65) Prior Publication Data
US 2024/0297333 A1 Sep. 5, 2024

(30) Foreign Application Priority Data

Sep. 28, 2021 (KR) ........................ 10-2021-0128233
Sep. 20, 2022 (KR) ........................ 10-2022-0118393

(51) Int. Cl.
*H01M 10/04* (2006.01)
*H01M 10/615* (2014.01)
(Continued)

(52) U.S. Cl.
CPC ..... *H01M 10/0468* (2013.01); *H01M 10/615*
(2015.04); *H01M 10/446* (2013.01); *H01M
50/211* (2021.01)

(58) Field of Classification Search
CPC ........................ H01M 10/0468; H01M 10/615
See application file for complete search history.

(56) References Cited

U.S. PATENT DOCUMENTS

2010/0151309 A1* 6/2010 Marukawa .......... H01M 10/613
429/120
2018/0205110 A1 7/2018 Yuk et al.
(Continued)

FOREIGN PATENT DOCUMENTS

JP 2008-147079 A 6/2008
JP 2009-054403 A 3/2009
(Continued)

OTHER PUBLICATIONS

International Search Report (with translation) and Written Opinion
dated Jan. 6, 2023 issued in corresponding International Patent
Application No. PCT/KR2022/014195.
(Continued)

*Primary Examiner* — Olatunji A Godo
(74) *Attorney, Agent, or Firm* — Morgan, Lewis &
Bockius LLP

(57) ABSTRACT

A battery cell pressurization device may include a housing
in which battery cells are disposed in parallel, pressurizing
plates alternately disposed with the battery cells and con-
figured to heat and pressurize the battery cells in the hous-
ing, and a pressurizing driver configured to drive the pres-
surizing plates to pressurize the battery cells. Each
pressurizing plate may include pressurizing protrusions and
heating lines installed in the pressurizing protrusions on a
side facing the respective battery cell.

15 Claims, 11 Drawing Sheets

(51) Int. Cl.
    *H01M 10/44*      (2006.01)
    *H01M 50/211*    (2021.01)

(56)           References Cited

U.S. PATENT DOCUMENTS

| | | | |
|---|---|---|---|
| 2018/0248219 A1 | 8/2018 | Kim et al. | |
| 2018/0277818 A1* | 9/2018 | Nagai | H01M 50/516 |
| 2019/0051924 A1 | 2/2019 | Kim et al. | |
| 2019/0379083 A1 | 12/2019 | Jung et al. | |
| 2020/0044233 A1* | 2/2020 | Choi | H01M 10/058 |
| 2021/0351431 A1 | 11/2021 | Hwang | |
| 2022/0052425 A1* | 2/2022 | Tajima | H01M 50/531 |

FOREIGN PATENT DOCUMENTS

| | | |
|---|---|---|
| JP | 2014-232665 A | 12/2014 |
| JP | 2015-138646 A | 7/2015 |
| KR | 10-2013-0141046 A | 12/2013 |
| KR | 10-2015-0037049 A | 4/2015 |
| KR | 10-2017-0071971 A | 6/2017 |
| KR | 10-2017-0124336 A | 11/2017 |
| KR | 10-2017-0124341 A | 11/2017 |
| KR | 10-1838350 B1 | 3/2018 |
| KR | 10-1949687 B1 | 2/2019 |
| KR | 10-2019-0031847 A | 3/2019 |
| KR | 10-2019-0126494 A | 11/2019 |
| KR | 10-2021-0051164 A | 5/2021 |
| KR | 10-2256599 B1 | 5/2021 |
| WO | 2021/085798 A1 | 5/2021 |

OTHER PUBLICATIONS

Office Action dated Jun. 10, 2024 issued in Japanese Patent Application No. 2023-532624.

* cited by examiner

[FIG. 1]
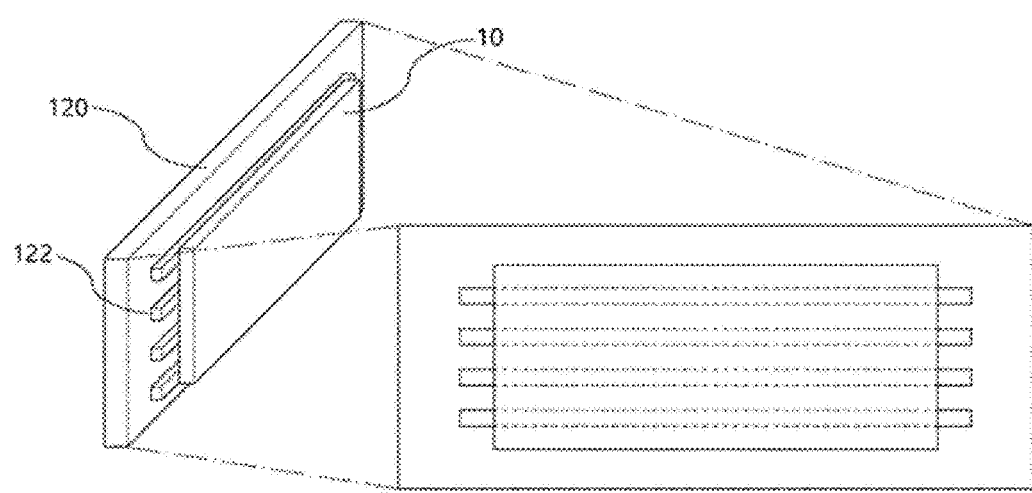
[FIG. 2]
5

[FIG. 4]
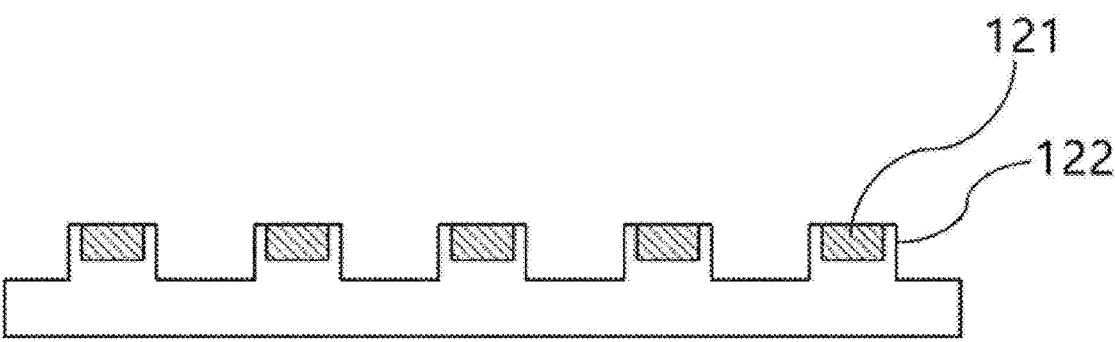
[FIG. 5]
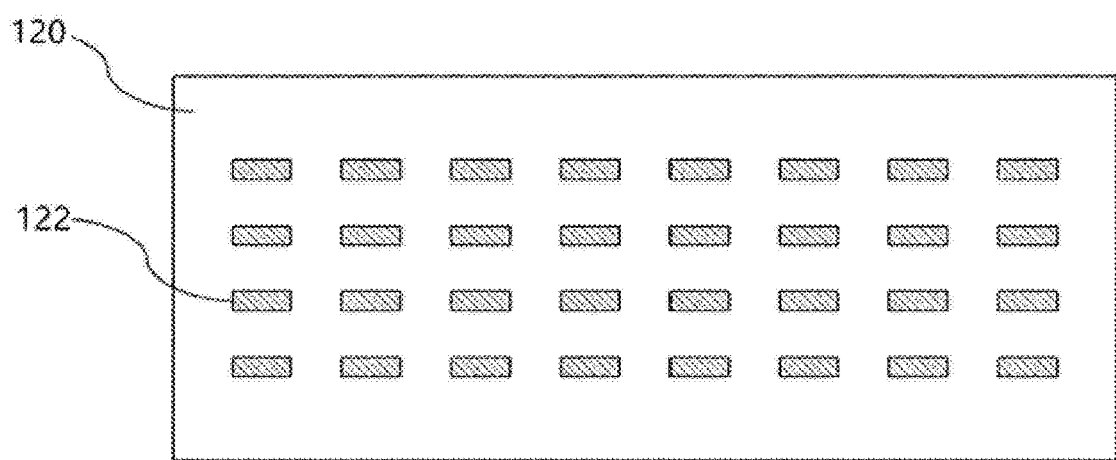
5

[FIG. 7]
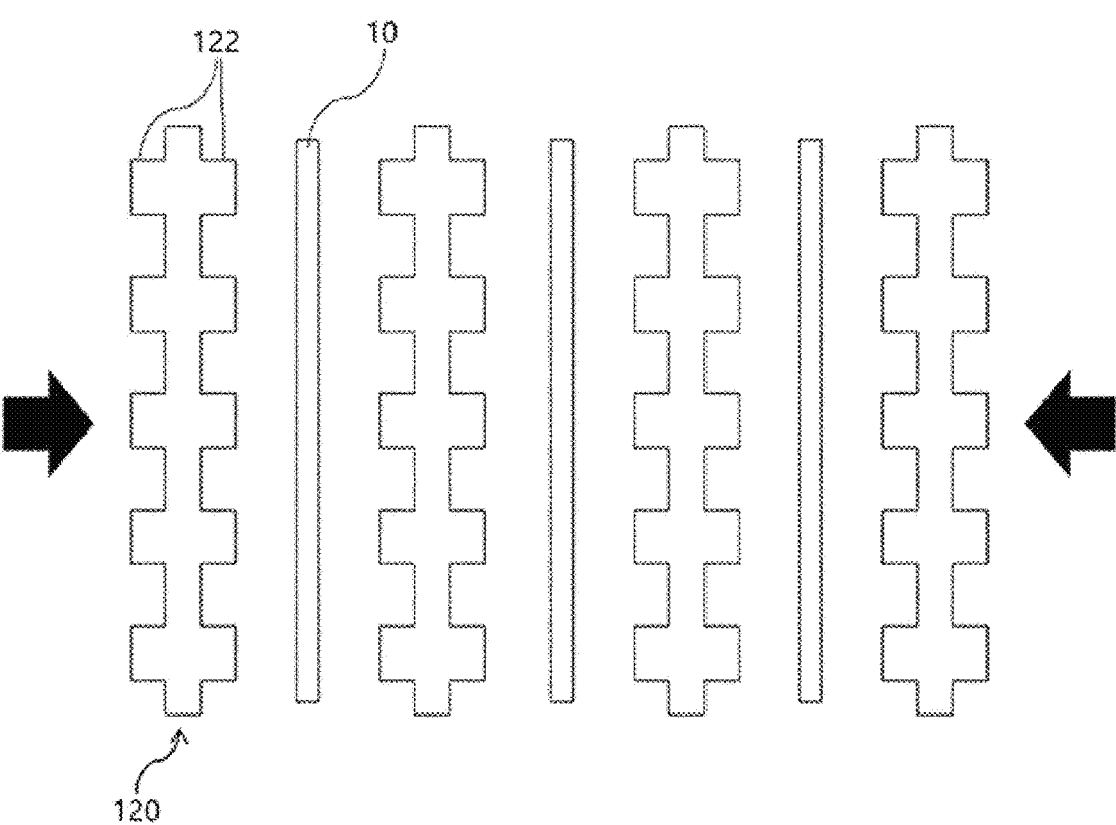

[FIG. 9]
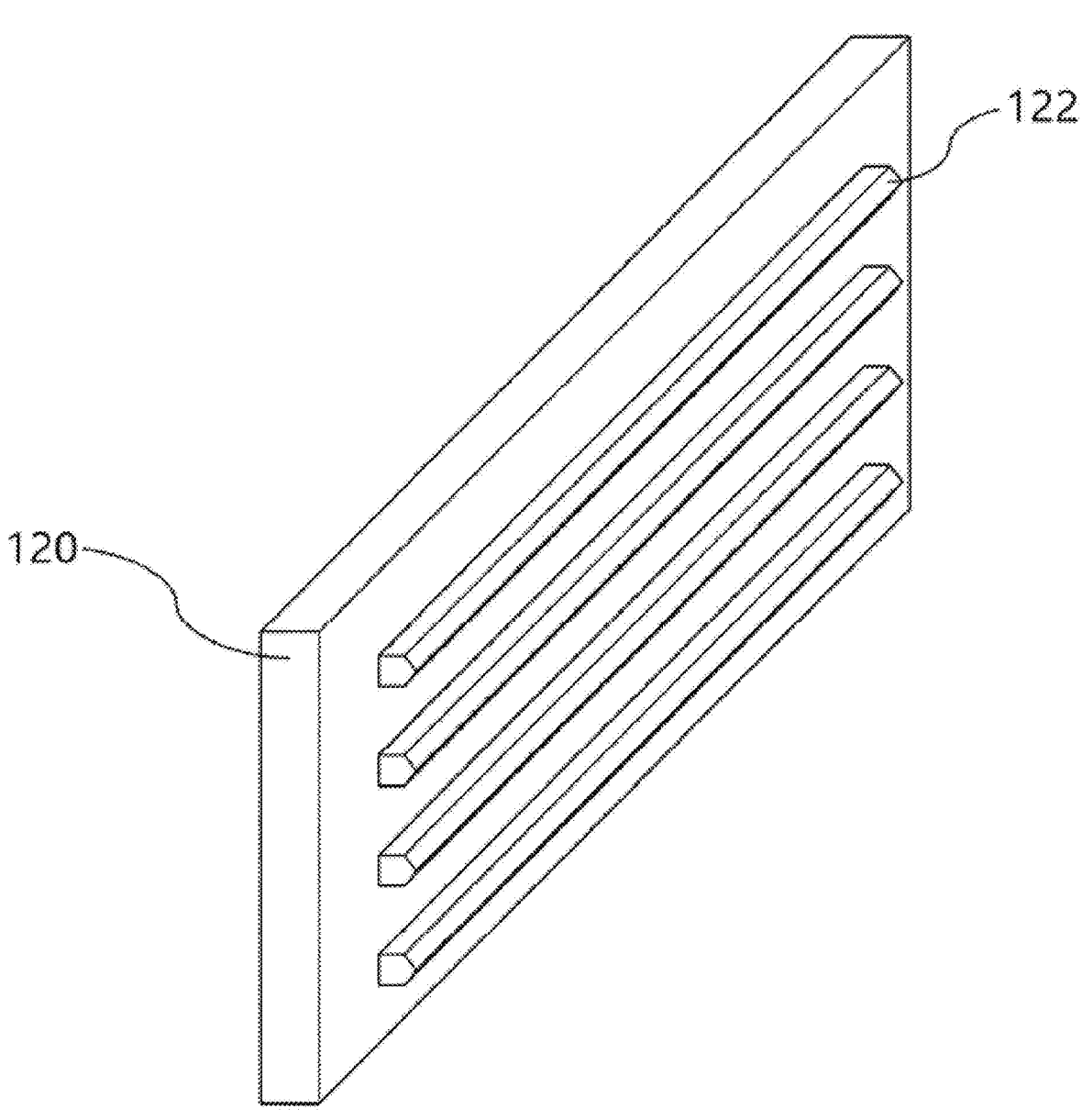

[FIG. 10]
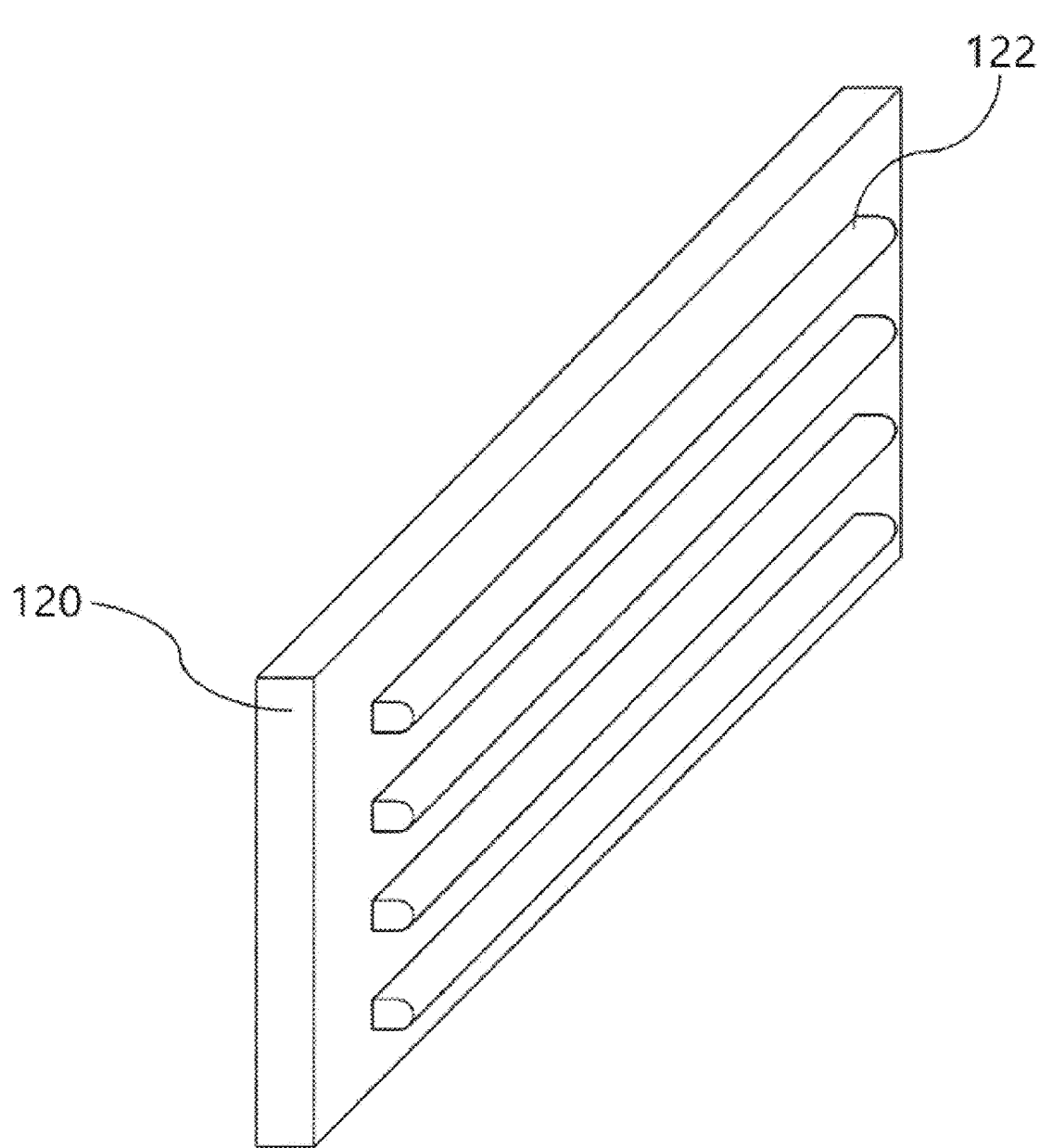

[FIG. 11]
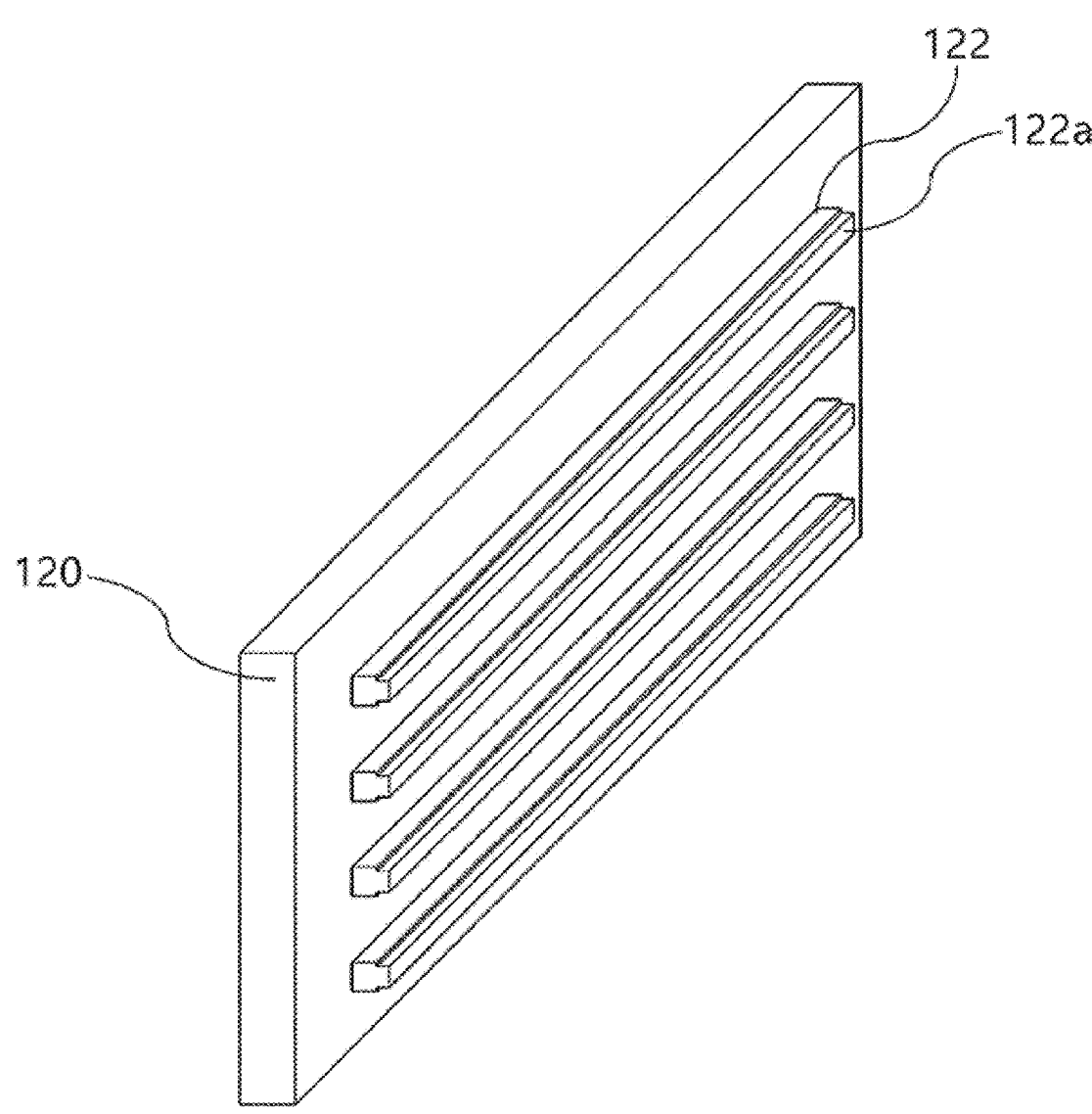
5

[FIG. 12]
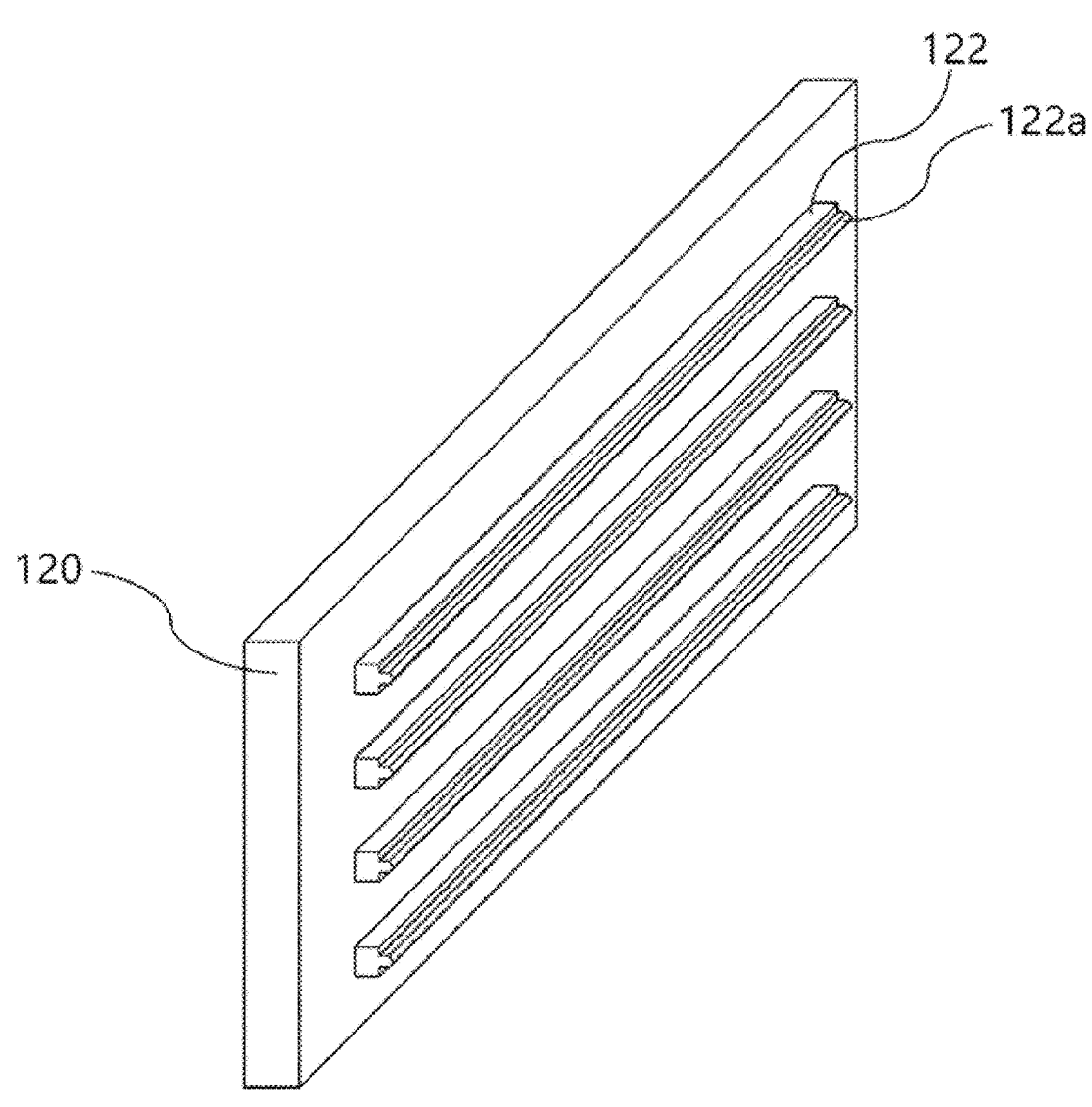

[FIG. 13]
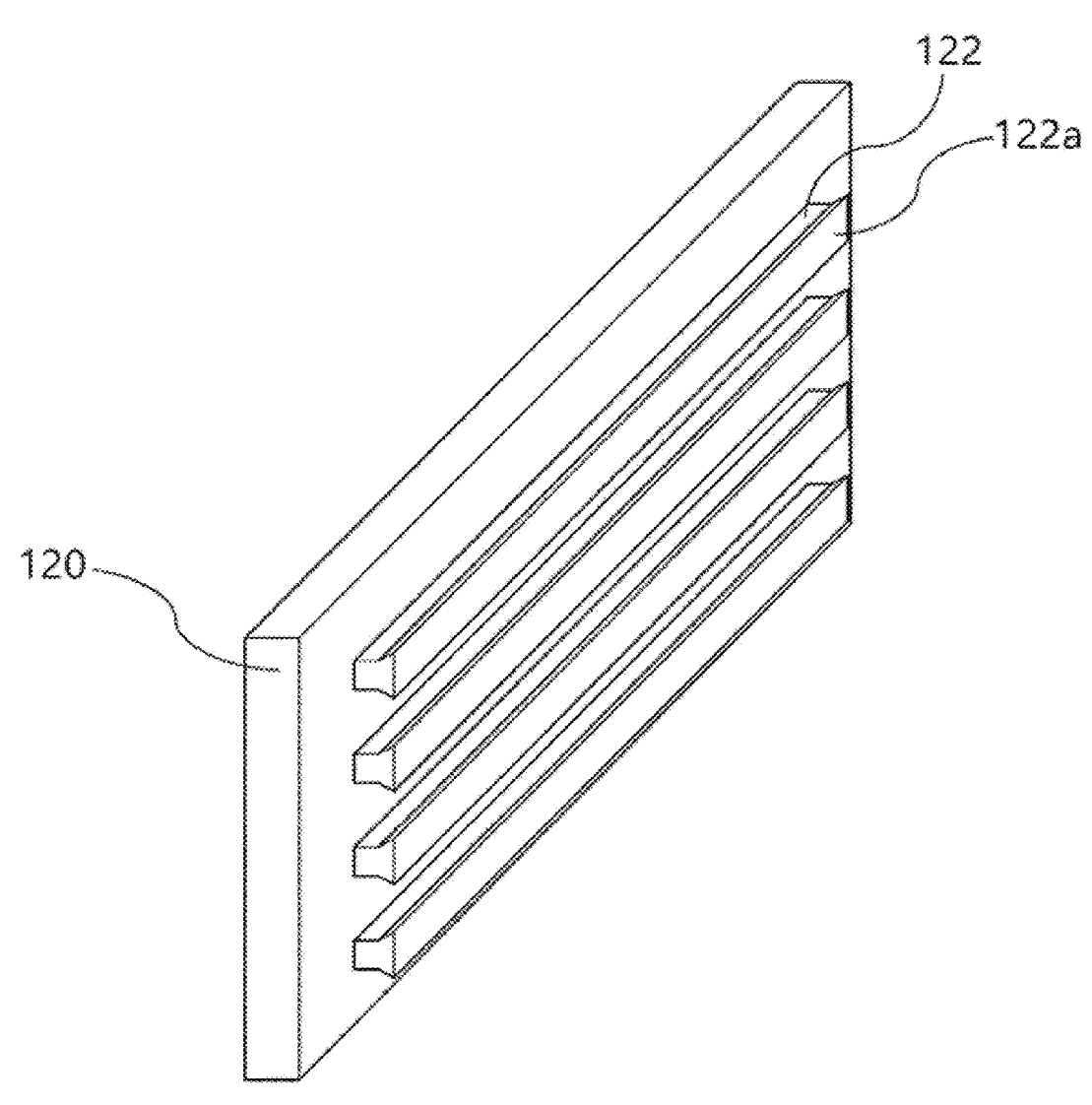

BATTERY CELL PRESSURIZATION DEVICE

TECHNICAL FIELD

The present invention relates to a battery cell pressurization device, and specifically, to a battery cell pressurization device in which a heating line having a predetermined pattern is formed on a pressurizing plate for heating a battery cell.

This application claims the benefit of priority based on Korean Patent Application Nos. 10-2021-0128233, filed on Sep. 28, 2021 and 10-2022-0118393, filed on Sep. 20, 2022, and the entire contents of the Korean patent applications are incorporated as a part of the present specification.

BACKGROUND ART

Pouch-type lithium secondary batteries (hereafter referred to as battery cells) as unit cells of batteries have flexibility, are relatively free in shape, are light in weight, and have excellent safety so that demand is increasing as power sources for portable electronic devices such as portable phones, camcorders, and notebook computers.

The battery cell has a structure in which a plurality of positive electrodes (aluminum foils) and negative electrodes (copper foils) are stacked with separators interposed therebetween, a positive electrode tab is welded to the positive electrode and a negative electrode tab is welded to the negative electrode, and then these components are surrounded and sealed by an aluminum pouch.

A manufacturing process of such a battery cell can be roughly divided into three processes including an electrode process, an assembly process, and an activation process. The electrode process includes a process of preparing an electrode active material by mixing materials at an appropriate ratio, coating a current collector, which is a metal foil, with the electrode active material, rolling an electrode through a roll press, and a slitting process of cutting the electrode according to a predetermined size.

In addition, in the assembly process, an electrode assembly is manufactured by stacking a positive electrode material, a separator, and a negative electrode material through notching for forming an electrode tab, and after the electrode assembly is accommodated in a battery case, a battery cell (packaging cell) is manufactured by putting an electrolyte into the battery case.

Finally, the activation process is a process of imparting predetermined electrical characteristics by repeating charging/discharging of the assembled battery cell.

When the electrolyte is put into the battery case in the assembly process prior to the activation process, the electrolyte is impregnated into a space between an electrode and a separator of the stacked and bonded electrode assembly. Impregnation of the electrolyte is necessary for a cell reaction. However, when the electrolyte is impregnated, the electrode assembly may swell and thus a gap between a positive electrode, the separator, and a negative electrode may become wider. When the activation process is performed in the above state, activation is not performed well, and there is a concern that the electrode assembly undergoing the activation process is bent and deformed.

For this reason, prior to the activation process, a pre-heating and pressurizing process of heating and pressurizing the battery case into which the electrolyte is injected at a predetermined temperature and a predetermined pressure is performed. In the pre-heating and pressurizing process, the swollen electrode assembly is heated and pressurized so that the electrolyte is squeezed out from the gap between the positive electrode, the separator, and the negative electrode, and the electrode and the separator of the electrode assembly are brought into close contact again.

However, when a pressurizing plate heats and pressurizes the entire surface of the battery cell in the heating and pressurizing process, the electrode and the separator are densely coupled and thus it is difficult for the squeezed-out electrolyte to be impregnated again. For activation, the electrode assembly needs to be brought into close contact again, and for a charging/discharging battery reaction during the activation, a predetermined amount of the electrolyte should be re-impregnated into the electrode assembly again.

Therefore, it is necessary to develop a technology capable of bringing the electrode assembly into close contact so as to have a rigidity suitable for activation and re-impregnating the electrolyte into a gap of the electrode assembly.

DISCLOSURE

Technical Problem

An object of the present invention is to provide a battery cell pressurization device capable of efficiently heating and pressurizing an electrode assembly prior to an activation process of a battery cell to secure the rigidity of the electrode assembly in the battery cell and manufacturing a battery cell in which an electrolyte can be re-impregnated.

Technical Solution

In one embodiment of the present invention, there is provided a battery cell pressurization device including a housing in which a plurality of battery cells are disposed in parallel, pressurizing plates alternately disposed with the battery cells and configured to heat and pressurize the battery cells in the housing, and a pressurizing driver configured to drive the pressurizing plates to pressurize the battery cells, wherein the pressurizing plate includes a plurality of pressurizing protrusions and heating lines installed in the pressurizing protrusions on a side facing the battery cell.

The pressurizing protrusions may be disposed apart from each other by a predetermined interval on one side of the pressurizing plate in a vertical direction.

The pressurizing protrusions may be formed to extend in parallel in a length direction of the pressurizing plate.

The pressurizing protrusions may be consecutively formed in a length direction of the pressurizing plate or intermittently formed at intervals in the length direction.

The pressurizing protrusions may be disposed on the pressurizing plate at equal intervals.

The pressurizing protrusions may be formed on both side surfaces of the pressurizing plate.

The pressurizing protrusions may be provided on upper and lower portions of the pressurizing plate to pressurize upper and lower portions of the battery cell.

A cross section of the pressurizing protrusion may include at least one among a quadrangular pyramid shape, a pentagonal pyramid shape, a trapezoid shape, and an arched shape.

A spacing between the pressurizing protrusions may be at least 1.0 cm or more.

A thickness of an end portion of the pressurizing protrusion may range from 0.3 cm to 1.5 cm in a height direction of the pressurizing plate.

An end portion of the pressurizing protrusion may include a protruding tip.

The heating line may be provided at an end portion of the pressurizing protrusion to be exposed to the outside.

A temperature of the heating line may range from 50° C. to 75° C.

The pressurizing protrusion may pressurize only 50% or less of the entire area of the battery cell.

Advantageous Effects

In accordance with the present invention, an electrode assembly can be efficiently heated and pressurized prior to an activation process of a battery cell to secure the rigidity of the electrode assembly in the battery cell, and a battery cell in which an electrolyte is re-impregnated can be manufactured.

In addition, a heating line for heating the battery cell is formed in a predetermined pattern to control a bonding area of the electrode assembly so that wettability of the electrolyte in the battery cell can be improved.

BRIEF DESCRIPTION OF THE DRAWINGS

FIG. 1 is a diagram illustrating a battery cell pressurization device of the present invention.

FIG. 2 is a diagram illustrating a pressurizing plate and a battery cell disposed to face the pressurizing plate included in the battery cell pressurization device according to a first embodiment of the present invention.

FIG. 4 is a diagram illustrating a pressurizing plate included in a battery cell pressurization device according to a second embodiment of the present invention.

FIG. 5 is a diagram illustrating a pressurizing plate included in a battery cell pressurization device according to a third embodiment of the present invention.

FIG. 7 is a diagram illustrating the pressurizing plate of FIGS. 6A and 6B and a battery cell disposed to face the pressurizing plate.

FIG. 9 is a diagram illustrating a pressurizing plate included in a battery cell pressurization device according to a sixth embodiment of the present invention.

FIG. 10 is a diagram illustrating a pressurizing plate included in a battery cell pressurization device according to a seventh embodiment of the present invention.

FIG. 11 is a diagram illustrating a pressurizing plate included in a battery cell pressurization device according to an eighth embodiment of the present invention.

FIG. 12 is a diagram illustrating a pressurizing plate included in a battery cell pressurization device according to a ninth embodiment of the present invention.

FIG. 13 is a diagram illustrating a pressurizing plate included in a battery cell pressurization device according to a tenth embodiment of the present invention.

EMBODIMENTS OF THE DISCLOSURE

Figure 3A:
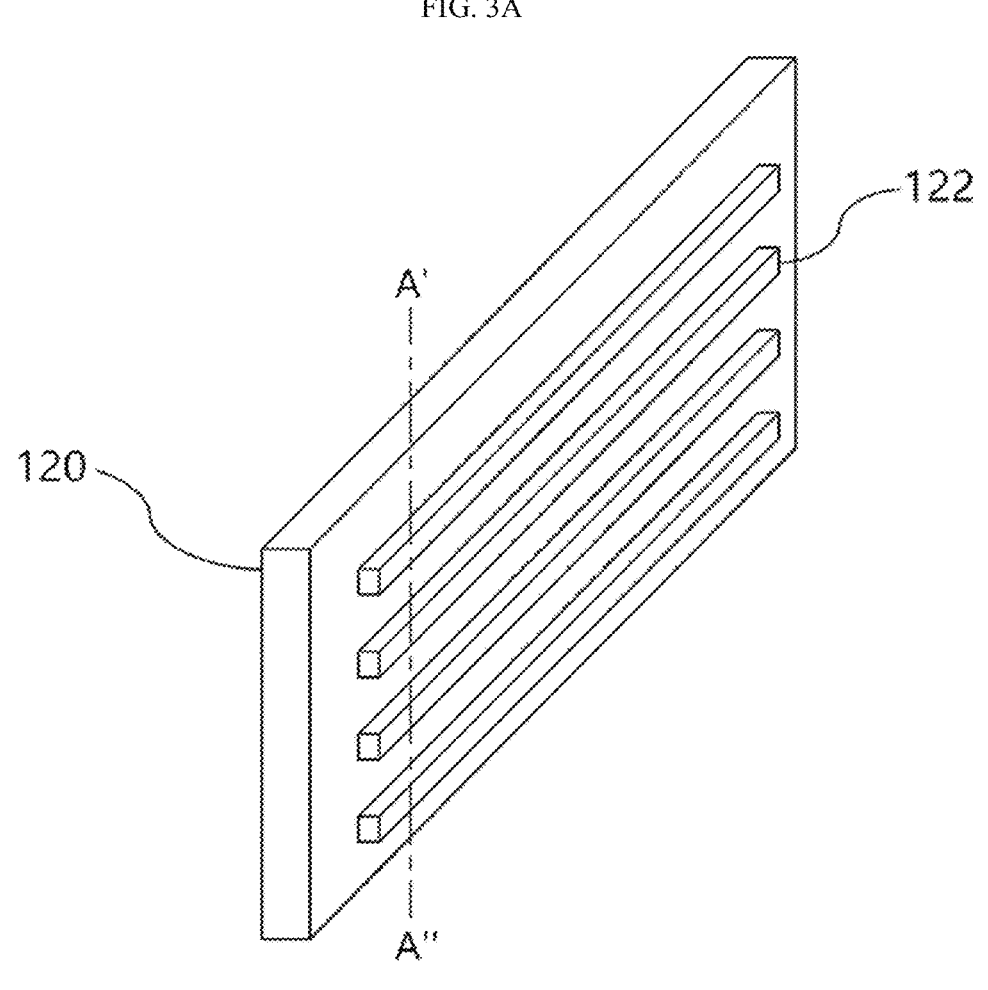
FIGS. 3A and 3B illustrate a perspective view and a cross-sectional view of the pressurizing plate of FIG. 2.

The present invention is characterized in that, in order to secure the rigidity of an electrode assembly in a battery cell 10 and allow an electrolyte to be re-impregnated, when the battery cell 10 is heated and pressurized, a pressurizing plate 120 having a pressurizing protrusion 122 with a predetermined pattern and a heating line 121 pressurizes the battery cell 10 so as to adjust an adhesion area and an adhesion path of the electrode assembly.

FIG. 1 shows a battery cell pressurization device 100 of the present invention. The battery cell pressurization device 100 of the present invention includes a housing 110 in which a plurality of battery cells 10 are disposed in parallel, pressurizing plates 120 alternately disposed with the battery cells 10 and configured to heat and pressurize the battery cells 10 in the housing 110, and a pressurizing driver 130 configured to drive the pressurizing plates 120 to pressurize the battery cells 10. The pressurizing plate 120 includes a plurality of pressurizing protrusions 122 provided on a side surface facing the battery cell 10, and a heating line 121 installed in the pressurizing protrusion 122.

Referring to FIG. 1, the battery cell pressurization device 100 of the present invention includes the housing 110 in which the plurality of battery cells 10 are disposed in parallel.

The housing 110 may serve to protect and support the battery cells 10 and the pressurizing plates 120, and it is sufficient for the housing 110 to have a structure in which the battery cells 10 can be easily installed and removed.

The housing 110 has an open structure with two open side surfaces, but the present invention is not limited thereto. That is, the housing 110 may be formed in a closed structure in which the battery cells 10 are installed through an entry door or the like.

There is no particular limitation on the number of battery cells 10 installed in the housing 110.

The battery cell 10 may be, for example, a pouch-type cell in which an electrode assembly is accommodated in a pouch-type case.

The battery cells 10 are disposed in parallel in the housing 110 in one direction so that the pressurizing plates 120, which will be described below, may heat and pressurize the battery cells 10 from one side or both sides.

The battery cell pressurization device of the present invention includes the pressurizing plates 120 between the battery cells 10 for pressurizing the battery cells 10.

The pressurizing plate 120 is formed as a rectangular plate corresponding to a shape of the battery cell 10.

A material of the pressurizing plate 120 is not particularly limited, and as described below, since the heating line 121 is embedded, it is necessary to employ a material that facilitates heat conduction.

The pressurizing plate 120 may be greater than an area of the battery cell 10 in order to prevent an occurrence of a phenomenon in which a desired area of the battery cell 10 is not pressurized. That is, a length and width of the pressurizing plate 120 may be formed greater than a length and width of the battery cell 10, respectively. Therefore, the pressurizing plate 120 may effectively pressurize and heat the battery cell 10 through the pressurizing protrusions 122 and the heating lines 121, which are provided on a surface of the pressurizing plate 120.

The pressurizing plate 120 is installed in the housing 110 to be movable with respect to the battery cell 10 so as to pressurize the battery cell 10. For example, the pressurizing plates 120 may be moved in a direction perpendicular to the arrangement direction of the battery cells 10.

In addition, the present invention includes a driver configured to pressurize and drive the pressurizing plates 120. FIG. 1 shows the pressurizing driver 130 and a driving arm 131 connected to the pressurizing driver 130. When a driving force is transmitted from the pressurizing driver 130 disposed on one side of the housing 110, the driving arm 131 performs a piston movement of a predetermined stroke to pressurize the pressurizing plates 120. Thus, the battery cells 10 are pressurized by the pressurizing plates 120 disposed therebetween. FIG. 1 shows a state in which the pressurizing plates 120 are moved to pressurize the battery cells. Since the pressurizing plates 120 are disposed between the battery cells 10, side surfaces of one battery cell 10 may be pressurized by the pressurizing plates 120 on both sides of the one battery cell 10. Among the disposed battery cells 10, the last battery cell 10 installed adjacent to the housing 110 has one surface pressurized by the pressurizing plate 120 and the other surface pressurized by an inner surface of the housing 110. A shape of the pressurizing driver 130, a length of the driving arm 131, and a shape of the housing 110 may be appropriately changed. For example, the driver may be a servomotor, and the driving arm 131 may be a ball screw that is rectilinearly moved by receiving a rotating force of the driver. Alternatively, the driving arm 131 may be a piston-cylinder mechanism that is movable up and down due to pneumatic or hydraulic pressure. That is, the driving arm 131 and the driver are not particularly limited as long as they can move the pressurizing plate 120 in a direction parallel to the battery cell 10.

Meanwhile, the pressurizing plate 120 may be stably guided while being moved by a guide member (not shown). For example, both side walls may be installed on the housing 110, and guides for guiding both sides of the pressurizing plate 120 may be formed on the both side walls. Alternatively, a guide rail to which upper and lower portions of the pressurizing plate 120 are coupled may be formed in an upper or lower portion of the housing 110. Although the battery cells 10 have been illustrated in FIG. 1 as being exposed without an upper plate, an upper plate may be coupled to the pressurizing plates 120, and a guide rail may be installed on the upper plate. As shown in FIG. 1, adding a guide mechanism to the pressurization device having the driving arm 131 belongs to a well-known technology, and thus a further detailed description thereof will be omitted herein.

The major feature of the battery cell pressurization device 100 of the present invention is that the pressurizing protrusions 122 protruding from a side surface of the pressurizing plate 120 and the heating line 121 installed in the pressurizing protrusion 122 are provided.

The battery cell pressurization device 100 of the present invention will be described in more detail with reference to the following embodiments and accompanying drawings.

DETAILED DESCRIPTION OF THE PREFERRED-EMBODIMENTS

First Embodiment

FIG. 2 is a diagram illustrating a pressurizing plate 120 and a battery cell 10 disposed on one side of the pressurizing plate 120 included in a battery cell pressurization device 100 according to a first embodiment of the present invention.

Referring to FIG. 2, a plurality of pressurizing protrusions 122 are provided on a side surface of the pressurizing plate 120, that is, one side thereof facing the battery cell 10.

The pressurizing plate 120 is moved toward the battery cell 10 and pressurizes one side of the battery cell 10 through the pressurizing protrusions 122.

Through the pressurization, the battery cell 10 may be pressurized along a shape of the pressurizing protrusion 122, and an electrolyte membrane included in an electrode assembly inside the battery cell 10 may be brought into close contact with an electrode.

As shown in FIG. 2, the pressurizing protrusions 122 are disposed apart from each other by predetermined intervals on one side of the pressurizing plate 120 in a vertical direction. That is, the plurality of pressurizing protrusions 122 disposed on the pressurizing plate 120 are not connected to each other. In this case, the pressurizing protrusions 122 may be disposed to have equal intervals within an optimal interval range.

The pressurizing protrusion 122 included in the pressurizing plate 120 of the battery cell pressurization device 100 according to the first embodiment of the present invention has a quadrangular cross-sectional shape, and the battery cell 10 is pressurized through a flat end portion of the pressurizing protrusion 122.

Referring to FIG. 2, the battery cell 10 pressurized by the pressurizing plates 120 is pressurized by the pressurizing protrusions 122 at four positions spaced a predetermined interval from each other in the vertical direction.

In addition, the pressurizing protrusions 122 are formed to extend in parallel in a length direction of the pressurizing plate 120. In particular, the pressurizing protrusion 122 included in the pressurizing plate 120 of the battery cell pressurization device 100 according to the first embodiment of the present invention is consecutively formed in the length direction of the pressurizing plate 120 without interruption.

In this case, the pressurizing protrusion 122 may pressurize the battery cell 10 from one end to the other end thereof without interruption. Therefore, due to the pressurizing protrusion 122 having the above shape, the separator and the electrode included in the battery cell 10 may be more stably bonded.

When the pressurizing plate 120 pressurizes the battery cell 10, the pressurizing protrusions 122 pressurize as much as only a specific area of the battery cell 10. Specifically, the pressurizing protrusions 122 may pressurize as much as only 50% or less of the entire area of the battery cell 10. That is, the pressurizing protrusions 122 may be formed on the pressurizing plate 120 to pressurize only 50% or less of the entire area of the battery cell 10. In this case, when the pressurizing protrusions 122 pressurize an area exceeding 50% of the entire area of the battery cell 10, there is a risk that a content of the electrolyte re-impregnated into the separator of the electrode assembly is reduced, or a large portion of the electrode assembly is pressurized so that battery performance is degraded.

A thickness of an end portion of the pressurizing protrusion 122 may be adjusted to allow a bonding portion to be formed within a specific thickness range. Specifically, a thickness of the end portion of the pressurizing protrusion 122 may range from 0.3 cm to 1.5 cm in a height direction of the pressurizing plate 120. In this case, when the thickness of the end portion of the pressurizing protrusion 122 is less than 0.3 cm, an effect of pressurizing the electrode assembly may be insignificant, and when the thickness of the end portion of the pressurizing protrusion 122 exceeds 1.5 cm, it is difficult for the electrolyte to be re-impregnated into the pressurized part so that a function of the battery may be degraded.

The spacing between the plurality of pressurizing protrusions 122 formed on one side of the pressurizing plate 120 may be maintained at a minimum separation distance. Specifically, the spacing between the pressurizing protrusions 122 may be at least 1.0 cm or more. In this case, when the spacing between the pressurizing protrusions 122 is less than 1.0 cm, there may be a problem in that it is difficult for the electrolyte to be re-impregnated between the bonding portions formed by a pair of pressurizing protrusions 122 located adjacent to each other.

Figure 3B:
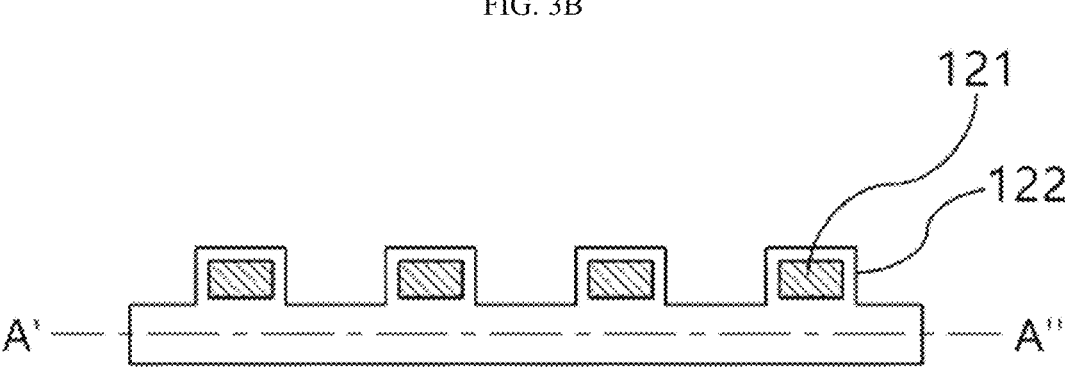

FIG. 3A illustrates a perspective view of the pressurizing plate 120 of FIG. 2, FIG. 3B illustrates a cross sectional cut in a height direction of the pressurizing plate 120 of FIG. 2, and the heating line 121 is installed inside the pressurizing protrusion 122.

In the inside of the pressurizing protrusion 122, the heating line 121 serves to transfer high-temperature heat to a portion of the battery cell 10 pressurized by the pressurizing protrusion 122. That is, a line-shaped bonding portion corresponding to the formation of the pressurizing protrusion 122 is formed in a portion of the electrode assembly inside the battery cell 10, which is pressurized by the pressurizing protrusion 122 and heated by the heating line 121. That is, the heating line 121 may heat the inside of the electrode assembly to melt an adhesive component of the electrode, thereby bonding the electrode and the separator.

The bonding portions may be formed to be spaced a predetermined distance from each other on the electrode assembly in the vertical direction corresponding to the shape of the pressurizing protrusions 122 or the heating lines 121 in the pressurizing plate 120. Accordingly, the electrolyte inside the battery cell 10 is squeezed into a space between the bonding portions and moves to a case space of the battery cell 10 outside the electrode assembly. In addition, the electrode and the separator are adhered based on the bonding portion so that the electrode assembly, which is swollen due to the injection of the electrolyte, is brought into close contact to restore rigidity.

However, since the space between the bonding portions is not heated by the heating line 121, the squeezed and moved electrolyte may move to the space again. That is, the re-impregnation of the electrolyte is performed through the space. As described above, according to the present invention, the electrode assembly is heated and pressurized by the plurality of heating lines 121 disposed apart from each other so that adhesion of the electrode assembly is restored and the re-impregnation of the electrolyte is possible. Therefore, it is possible to efficiently activate the electrode assembly having suitable rigidity in the activation process, and charging/discharging for activation may be appropriately performed due to the re-impregnated electrolyte.

The heating line 121 is maintained within a specific temperature range to obtain a desired effect without damaging to the electrode assembly. A temperature of the heating line 121 may range from 50° C. to 75° C., and more preferably, from 60° C. to 70° C. In this case, when the temperature of the heating line 121 is less than 50° C., the bonding portion may not be properly formed, and when the temperature of the heating line 121 exceeds 75° C., there is a risk that the electrode and the separator may be damaged due to high-temperature heat.

Second Embodiment

A heating line 121 included in a pressurizing plate 120 of a battery cell pressurization device 100 of the present invention may be in the form of being exposed to the outside. Specifically, the heating line 121 may be provided in an end portion of a pressurizing protrusion 122.

FIG. 4 shows a cross section of the pressurizing plate 120 included in the battery cell pressurization device 100 according to a second embodiment.

Referring to FIG. 4, the heating line 121 is provided to be exposed to the outside in the end portion of the pressurizing protrusion 122. In this way, when the heating line 121 is exposed to the outside, heat transfer efficiency increases so that the same effect according to the heating line 121 can be obtained even at a lower temperature.

Third Embodiment

Other than the form extending in the length direction of the pressurizing plate 120, a pressurizing protrusion 122 included in a pressurizing plate 120 of a battery cell pressurization device 100 of the present invention may have a different form.

FIG. 5 shows the pressurizing plate 120 included in the battery cell pressurization device 100 according to a third embodiment of the present invention.

Referring to FIG. 5, the pressurizing protrusions 122 are intermittently formed at intervals in a length direction of the pressurizing plate 120. In this case, bonding portions of an electrode assembly may also be intermittently formed in a length direction of a battery cell 10 so that an electrolyte may move through a space where the bonding portions are not continuous.

Fourth Embodiment

A pressurizing plate 120 of a battery cell pressurization device 100 of the present invention is able to pressurize a battery cell 10 through both side surfaces and, simultaneously, to form a bonding portion in an electrode assembly of each battery cell 10.

Figure 6A:
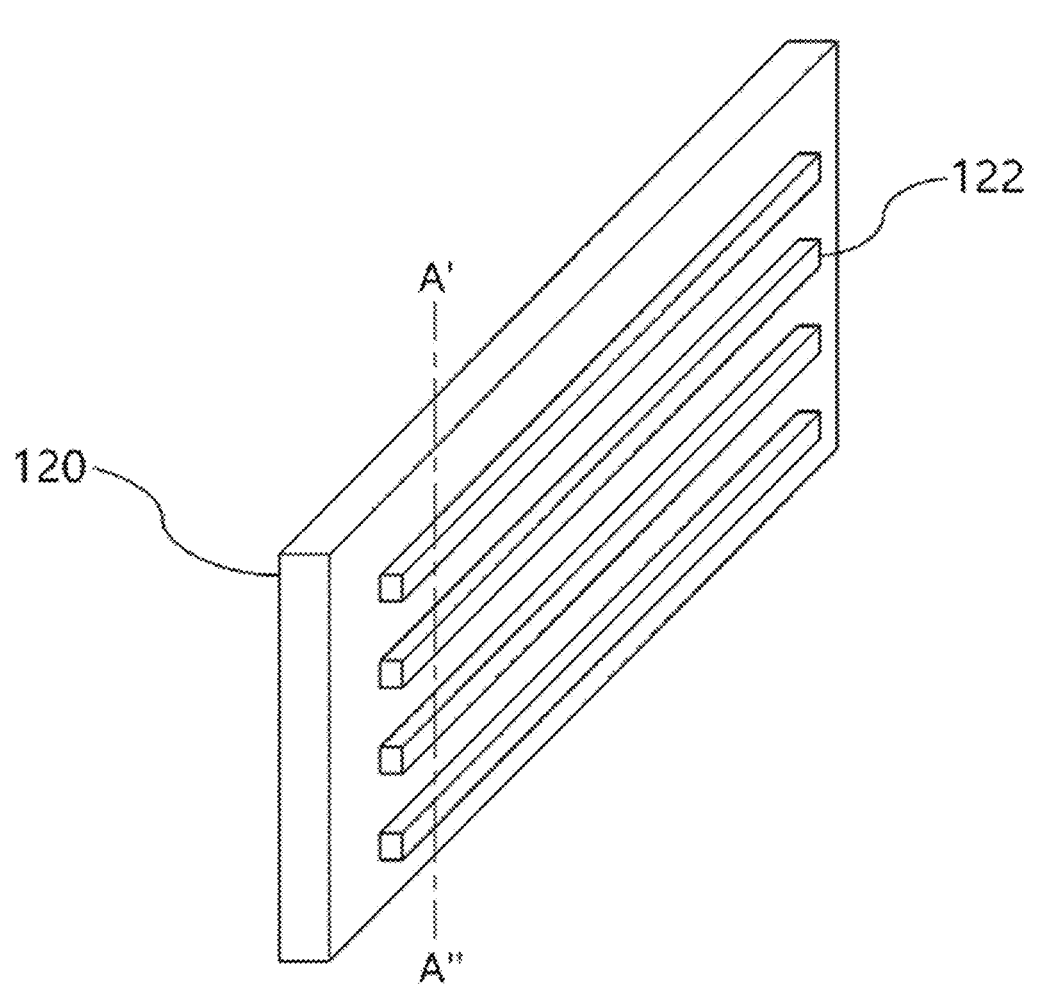
FIGS. 6A and 6B are diagrams illustrating a pressurizing plate included in a battery cell pressurization device according to a fourth embodiment of the present invention.
Figure 6B:
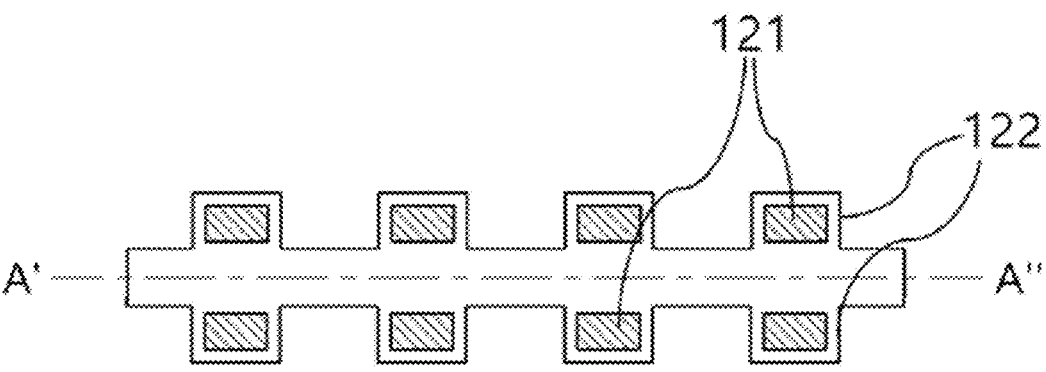

FIGS. 6A and 6B show the pressurizing plate 120 included in the battery cell pressurization device 100 according to a fourth embodiment of the present invention, FIG. 6A is a perspective view illustrating the pressurizing plate 120, and FIG. 6B is a cross-sectional view illustrating a cross section of the pressurizing plate 120 of FIG. 6A cut in a height direction of the pressurizing plate 120.

Referring to FIG. 6 FIGS. 6A and 6B, pressurizing protrusions 122 are formed on both sides of the pressurizing plate 120, a heating line 121 is installed in each pressurizing protrusion 122.

FIG. 7 shows that the pressurizing plates 120 and the battery cells 10 of FIGS. 6A and 6B are alternately disposed, and any one among the battery cells 10 may be pressurized by the pressurizing plates 120 disposed to face the one battery cell 10. In this case, when the battery cell 10 is pressurized using the pressurizing plates 120, it is possible to pressurize the battery cell 10 with less force. In addition, an adhesive portion may be easily formed on the electrode assembly included in the battery cell 10 using the heating line 121 of each pressurizing protrusion 122.

Therefore, when the battery cell 10 is pressurized and heated using the battery cell pressurization device 100 according to the fourth embodiment, the process may be more efficiently performed.

Fifth Embodiment

A pressurizing plate 120 of a battery cell pressurization device 100 of the present invention may pressurize only each of two regions that are upper and lower portions of a battery cell 10.

Figure 8A:
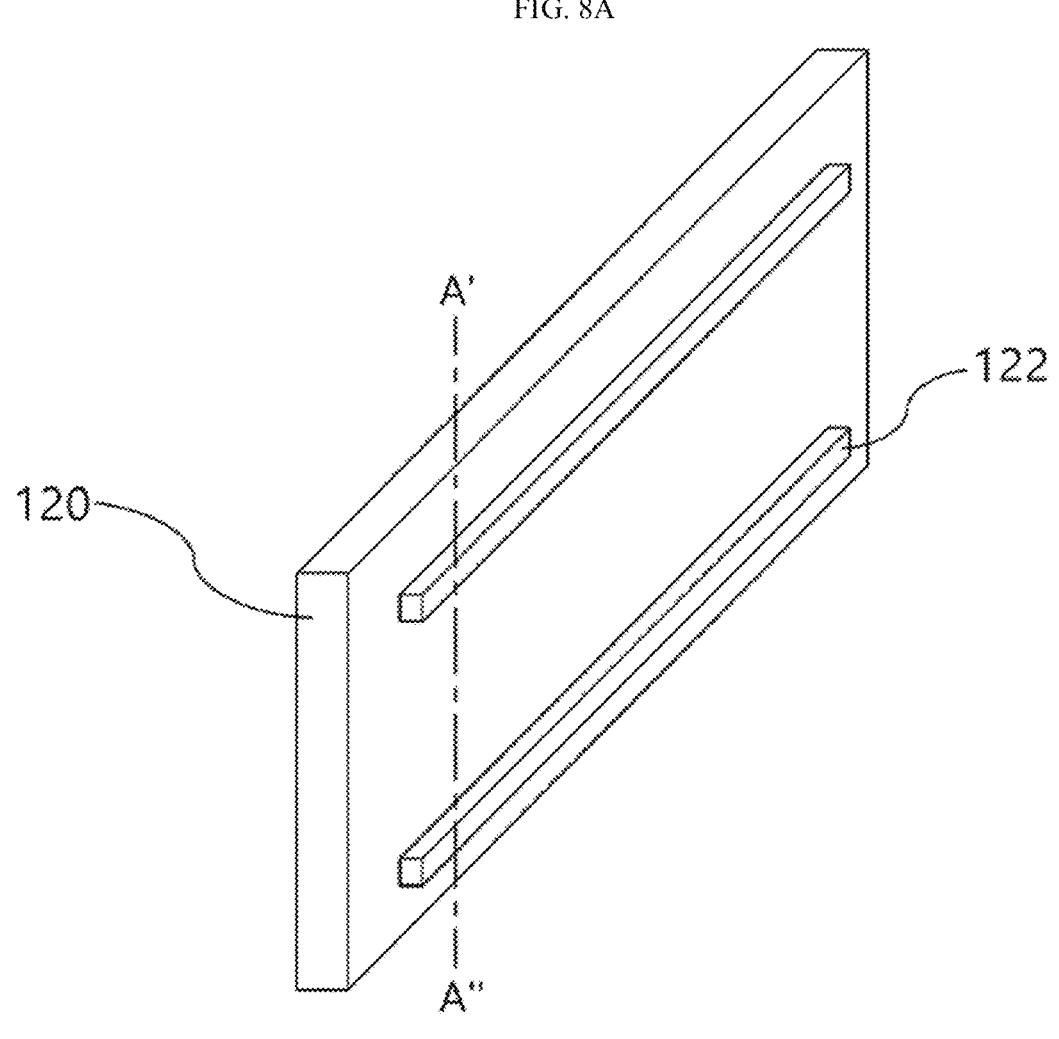
FIGS. 8A and 8B are diagrams illustrating a pressurizing plate included in a battery cell pressurization device according to a fifth embodiment of the present invention.
Figure 8B:
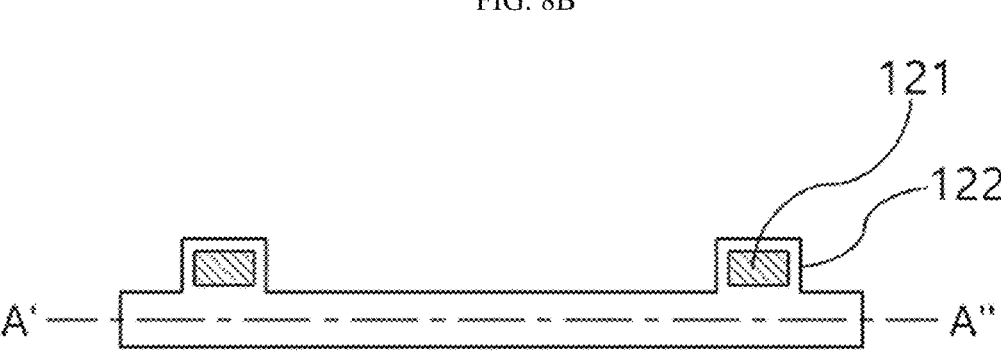

FIGS. 8A and 8B illustrate the pressurizing plate 120 included in the battery cell pressurization device 100 according to a fifth embodiment of the present invention, FIG. 8A is a perspective view illustrating the pressurizing plate 120, and FIG. 8B is a cross-sectional view illustrating a cross section of the pressurizing plate 120 of FIG. 8A cut in a height direction of the pressurizing plate 120.

Referring to FIG. 8 FIGS. 8A and 8B, the pressurizing protrusion 122 is provided on upper and lower portions of the pressurizing plate 120 to face and pressurize the upper and lower portions of the battery cell 10. Even in this case, a heating line 121 may be installed in the pressurizing protrusion 122.

When the battery cell 10 is pressurized and heated through the pressurizing plate 120, bonding portions are formed on upper and lower portions of the electrode assembly.

The battery cell pressurization device 100 according to the fifth embodiment has an effect of improving the degree of re-impregnation of the electrolyte by pressurizing a relatively small area of the entire area of the battery cell 10.

Sixth Embodiment

A shape of a pressurizing protrusion 122 included in a pressurizing plate 120 of a battery cell pressurization device 100 of the present invention may be variously modified, as necessary.

FIG. 9 shows the pressurizing plate 120 of the battery cell pressurization device 100 according to a sixth embodiment of the present invention, and a cross-sectional shape of the pressurizing protrusion 122 included in the pressurizing plate 120 has a pentagonal shape.

As shown in FIG. 9, the pressurizing protrusion 122 is provided on the pressurizing plate 120 such that a pentagonal-shaped horn is positioned at an end portion of the pressurizing protrusion 122. Therefore, when the battery cell 10 is pressurized by the pressurizing plate 120, a strong force and heat may be transferred to a relatively narrow position so that efficiency of pressurizing and heating can be increased.

Seventh Embodiment

FIG. 10 shows a pressurizing plate 120 of a battery cell pressurization device 100 according to a seventh embodiment of the present invention, and a cross-sectional shape of the pressurizing protrusion 122 included in the pressurizing plate 120 has an arched shape.

As shown in FIG. 10, the pressurizing protrusion 122 is provided on the pressurizing plate 120 such that a curved portion is positioned at an end portion of the pressurizing protrusion 122. Accordingly, when the battery cell 10 is pressurized by the pressurizing plate 120, there is an effect of being able to reduce the risk of damage to the electrode assembly due to the pressurization force.

Eighth Embodiment

FIG. 11 shows a pressurizing plate 120 of a battery cell pressurization device 100 according to an eighth embodiment of the present invention, and a pressurizing protrusion 122 included in the pressurizing plate 120 further includes a tip 122*a* protruding toward a front side.

As shown in FIG. 11, the tip 122*a* included in the pressurizing plate 120 of the battery cell pressurization device 100 according to the eighth embodiment of the present invention has a quadrangular cross section.

The tip 122*a* may be formed to protrude from an end portion of the pressurizing protrusion 122 to transmit pressure and heat to the electrode assembly inside the battery cell 10 in a narrower region.

Ninth Embodiment

FIG. 12 shows a pressurizing plate 120 of a battery cell pressurization device 100 according to a ninth embodiment of the present invention, and a pressurizing protrusion 122 included in the pressurizing plate 120 further includes a tip 122*a* protruding toward a front side.

As shown in FIG. 12, the tip 122*a* included in the pressurizing plate 120 of the battery cell pressurization device 100 according to the ninth embodiment of the present invention has an arched cross section. In this case, the tip 122*a* is provided such that a curved portion faces the battery cell 10, and when the pressurizing plate 120 pressurizes the battery cell 10, damage to the electrode assembly can be minimized.

The tip 122*a* may be formed to protrude from an end portion of the pressurizing protrusion 122 to transmit pressure and heat to the electrode assembly inside the battery cell 10 in a narrower region.

Tenth Embodiment

FIG. 13 shows a pressurizing plate 120 of a battery cell pressurization device 100 according to a tenth embodiment of the present invention, and a pressurizing protrusion 122 included in the pressurizing plate 120 further includes a tip 122*a* protruding toward a front side.

As shown in FIG. 13, the tip 122*a* included in the pressurizing plate 120 of the battery cell pressurization device 100 according to the tenth embodiment of the present invention has a trapezoid cross section. In this case, the tip 122*a* is provided such that a portion of a larger area faces the battery cell 10, and when the pressurizing plate 120 pressurizes the battery cell 10, the tip 122*a* may pressurize a large area of the electrode assembly and transfer heat thereto.

The invention claimed is:

1. A battery cell pressurization device, comprising:
   a housing in which a plurality of battery cells are disposed in parallel;
   pressurizing plates alternately disposed with the plurality of battery cells and configured to heat and pressurize the plurality of battery cells in the housing; and
   a pressurizing driver configured to drive the pressurizing plates to pressurize the plurality of battery cells,
   wherein each of the pressurizing plates includes a plurality of pressurizing protrusions and heating lines,
   wherein the heating lines are installed in the plurality of pressurizing protrusions on a side facing the respective battery cell,
   wherein the plurality of pressurizing protrusions are located outside the plurality of battery cells, and
   wherein a spacing between the plurality of pressurizing protrusions is at least 1.0 cm or more.

2. The battery cell pressurization device of claim 1, wherein the plurality of pressurizing protrusions are disposed apart from each other by a predetermined interval on one side of the respective pressurizing plate in a vertical direction.

3. The battery cell pressurization device of claim 1, wherein the plurality of pressurizing protrusions are formed to extend in parallel in a length direction of the respective pressurizing plate.

4. The battery cell pressurization device of claim 1, wherein the plurality of pressurizing protrusions are consecutively formed in a length direction of the respective pressurizing plate or intermittently formed at intervals in the length direction.

5. The battery cell pressurization device of claim 1, wherein the plurality of pressurizing protrusions are disposed on the respective pressurizing plate at equal intervals.

6. The battery cell pressurization device of claim 1, wherein the plurality of pressurizing protrusions are formed on both side surfaces of the respective pressurizing plate.

7. The battery cell pressurization device of claim 1, wherein the plurality of pressurizing protrusions are provided on upper and lower portions of the respective pressurizing plate to pressurize upper and lower portions of the respective battery cell.

8. The battery cell pressurization device of claim 1, wherein a cross section of each of the plurality of pressurizing protrusions includes at least one among a quadrangular shape, a pentagonal shape, a trapezoid shape, and an arched shape.

9. The battery cell pressurization device of claim 1, wherein a thickness of an end portion of each of the plurality of pressurizing protrusions ranges from 0.3 cm to 1.5 cm in a height direction of the respective pressurizing plate.

10. The battery cell pressurization device of claim 1, wherein an end portion of each of the plurality of pressurizing protrusions includes a protruding tip.

11. The battery cell pressurization device of claim 1, wherein each of the heating lines is provided at an end portion of the respective pressurizing protrusion to be exposed to an outside.

12. The battery cell pressurization device of claim 1, wherein a temperature of each of the heating lines ranges from 50° C. to 75° C.

13. The battery cell pressurization device of claim 1, wherein each of the plurality of pressurizing protrusions is configured to pressurize only 50% or less of an entire area of the respective battery cell.

14. The battery cell pressurization device of claim 1, wherein the pressurizing driver comprises a motor or comprises a device configured to generate pneumatic or hydraulic pressure.

15. The battery cell pressurization device of claim 1, further comprising a driving arm disposed between a last one of the pressurizing plates and the pressurizing driver, wherein the last one of the pressurizing plates is a pressurizing plate located closest to the pressurizing driver among the pressurizing plates, and wherein the driving arm is configured to receive a driving force from the pressurizing driver and to perform rectilinear movement to pressurize the pressurizing plates.

\* \* \* \* \*